US012208698B2

(12) United States Patent
Carbonell Maté et al.

(10) Patent No.: US 12,208,698 B2
(45) Date of Patent: Jan. 28, 2025

(54) FLUID VESSEL ASSEMBLY WITH WELDED CONNECTION

(71) Applicant: Lear Corporation, Southfield, MI (US)

(72) Inventors: Xavier Carbonell Maté, Valls (ES); Jordi Claramunt Blanco, Valls (ES); Jose Antonio Cubero Pitel, Valls (ES)

(73) Assignee: Lear Corporation, Southfield, MI (US)

( * ) Notice: Subject to any disclaimer, the term of this patent is extended or adjusted under 35 U.S.C. 154(b) by 209 days.

(21) Appl. No.: 16/672,975

(22) Filed: Nov. 4, 2019

(65) Prior Publication Data

US 2021/0129693 A1    May 6, 2021

(51) Int. Cl.
| | | |
|---|---|---|
| B60L 53/302 | (2019.01) | |
| B23K 20/12 | (2006.01) | |
| B23K 101/00 | (2006.01) | |
| B23K 101/12 | (2006.01) | |
| B23K 103/10 | (2006.01) | |
| B60L 3/00 | (2019.01) | |
| F28F 21/00 | (2006.01) | |

(52) U.S. Cl.
CPC ............ *B60L 53/302* (2019.02); *B23K 20/12* (2013.01); *B23K 20/122* (2013.01); *B60L 3/0023* (2013.01); *F28F 21/00* (2013.01); *B23K 2101/006* (2018.08); *B23K 2101/12* (2018.08); *B23K 2103/10* (2018.08); *Y02T 10/70* (2013.01); *Y02T 10/7072* (2013.01); *Y02T 90/12* (2013.01)

(58) Field of Classification Search
CPC .. B23K 20/122; B23K 20/1265; B23K 20/12; B23K 2101/006; B23K 2101/12; B23K 2103/10; H05K 7/20254; B60L 53/302; B60L 3/0023; F28F 21/00; Y02T 10/70; Y02T 10/7072; Y02T 90/12
See application file for complete search history.

(56) References Cited

U.S. PATENT DOCUMENTS

| | | | |
|---|---|---|---|
| 7,090,044 B2 * | 8/2006 | Nakamura | ......... H05K 7/20927 361/699 |
| 7,208,678 B2 | 4/2007 | Shinumra et al. | |
| 7,965,510 B2 | 6/2011 | Suzuki et al. | |
| 8,488,321 B2 * | 7/2013 | Brandenburg | ..... H05K 7/20927 165/80.4 |
| 8,628,875 B2 * | 1/2014 | Kim | .................... H01M 50/566 429/158 |
| 9,332,676 B2 | 5/2016 | Sharaf et al. | |
| 10,359,239 B1 * | 7/2019 | Jansen | ................ F28D 1/05366 |

(Continued)

FOREIGN PATENT DOCUMENTS

| | | | | |
|---|---|---|---|---|
| CN | 203645358 U | | 6/2014 | |
| CN | 107717207 A | * | 2/2018 | ........... B23K 20/122 |

(Continued)

*Primary Examiner* — Ljiljana V. Ciric
(74) *Attorney, Agent, or Firm* — Brooks Kushman P.C.

(57) ABSTRACT

A fluid vessel assembly is provided with a first vessel body with a first mating surface with a first plurality of generally planar nonparallel regions. The first vessel body forms a first portion of a fluid cavity. A second vessel body is provided with a second mating surface with a second plurality of generally planar nonparallel regions sized to engage the first mating surface. The second vessel body forms a second portion of the fluid cavity. The first mating surface and the second mating surface are friction stir welded together.

18 Claims, 3 Drawing Sheets

(56) References Cited

U.S. PATENT DOCUMENTS

| | | | | |
|---|---|---|---|---|
| 10,583,519 B2* | 3/2020 | Litwinski | ........... | B23K 20/1265 |
| 2004/0065716 A1* | 4/2004 | Young | ................... | B23K 33/00 |
| | | | | 228/2.1 |
| 2014/0233175 A1* | 8/2014 | Demange | ........... | H05K 7/20254 |
| | | | | 361/699 |
| 2018/0027704 A1* | 1/2018 | Shinozaki | .......... | H05K 7/20927 |
| | | | | 361/699 |

FOREIGN PATENT DOCUMENTS

| | | | | | |
|---|---|---|---|---|---|
| CN | | 108099681 A | | 6/2018 | |
| EP | | 3300829 A1 * | | 4/2018 | ........... B23K 20/122 |
| RU | | 2351447 C2 * | | 4/2009 | ........... B23K 11/002 |

* cited by examiner

FLUID VESSEL ASSEMBLY WITH WELDED CONNECTION

TECHNICAL FIELD

Various embodiments relate to connections for fluid vessel assemblies such as a cooling assembly for vehicle electronics, such as an on-board vehicle battery charger.

BACKGROUND

On-board vehicle battery chargers conduct high current, which consequently transmits a high heat. In order to manage the heat of such applications, fluid cooling vessels have been provided to cool the chargers. The fluid cooling vessels often include a body with a cavity and a cover that are sealed with a gasket and screws. Silicone and ultraviolet-curing gaskets have been provided.

The prior art has provided cooling fluid vessels, often referred to as cold-plates. The cold-plates are often formed of aluminum and include a housing with sidewalls defining a cavity with a cover enclosing the cavity. The cover is often sealed to the housing with a gasket, such as a silicone gasket or an ultraviolet-cured gasket. Such gasketed vessel assemblies are often held together with threaded fasteners. Gasketed vessel assemblies require gasket retention and mating surfaces and fastener assemblies to be designed into the size and shape of the fluid vessel.

SUMMARY

According to at least one embodiment, a fluid vessel assembly is provided with a first vessel body with a first mating surface. The first vessel body forms a first portion of a fluid cavity with a fluid inlet and a fluid outlet. A second vessel body is provided with a second mating surface sized to engage the first mating surface. The second vessel body forms a second portion of the fluid cavity. The first mating surface and the second mating surface are welded together to bond the first vessel body and the second vessel body together.

According to a further embodiment, the first mating surface is provided with a plurality of nonparallel regions.

According to an even further embodiment, the second mating surface is provided with a plurality of nonparallel regions.

According to another even further embodiment, the plurality of nonparallel regions of the first mating surface is each generally planar.

According to another even further embodiment, the plurality of nonparallel regions is each oriented at an angle relative to each sequential region that is less than sixty-five degrees.

According to another even further embodiment, the plurality of nonparallel regions is each oriented at an angle relative to each sequential region that is less than fifteen degrees.

According to another even further embodiment, the plurality of nonparallel regions is each oriented at an angle relative to each sequential region that is less than five degrees.

According to another even further embodiment, the plurality of nonparallel regions of the second mating surface is each generally planar.

According to another even further embodiment, the plurality of nonparallel regions of the first mating surface overlap the plurality of nonparallel regions of the second mating surface.

According to another even further embodiment, the plurality of nonparallel regions of the first mating surface abut the plurality of nonparallel regions of the second mating surface.

According to another even further embodiment, the plurality of nonparallel regions of the first mating surface overlap and abut the plurality of nonparallel regions of the second mating surface.

According to another further embodiment, the first mating surface and the second mating surface are welded together by friction welding.

According to another further embodiment, the first mating surface and the second mating surface are welded together by friction stir welding.

According to another further embodiment, the first mating surface extends generally perpendicular to a sidewall of the first vessel body. The second mating surface extends generally perpendicular to a sidewall of the second vessel body. The first vessel body sidewall is spaced apart from the second vessel body sidewall by at least one millimeter wider than the weld along the first vessel body and the second vessel body.

According to another further embodiment, the first vessel body is formed of aluminum. The second vessel body is formed of aluminum.

According to another further embodiment, the fluid vessel assembly does not include any threaded fasteners attaching the first vessel body to the second vessel body.

According to another further embodiment, the fluid vessel assembly does not include an additional gasket associated with the first mating surface or associated with the second mating surface between the first vessel body and the second vessel body.

According to another further embodiment, the fluid vessel assembly withstands an internal pressure of at least six atmospheric bars.

According to another further embodiment, the fluid vessel assembly withstands an internal pressure of at least ten atmospheric bars.

According to at least another embodiment, an assembly to cool a vehicle on-board battery charger is provided. A fluid vessel assembly is provided with a first vessel body with a first mating surface. The first vessel body forms a first portion of a fluid cavity with a fluid inlet and a fluid outlet. A second vessel body is provided with a second mating surface sized to engage the first mating surface. The second vessel body forms a second portion of the fluid cavity. The first mating surface and the second mating surface are welded together to bond the first vessel body and the second vessel body together. The first vessel body defines a cooling cavity body and the second vessel body defines a cover plate.

According to at least another embodiment, a method for assembling a fluid vessel assembly, provides a fluid vessel assembly with a first vessel body with a first mating surface. The first vessel body forms a first portion of a fluid cavity with a fluid inlet and a fluid outlet. A second vessel body is provided with a second mating surface sized to engage the first mating surface. The second vessel body forms a second portion of the fluid cavity. The first mating surface and the second mating surface are welded together to bond the first vessel body and the second vessel body together.

According to at least another embodiment, a method for assembling a fluid vessel assembly, provides a fluid vessel body with a fluid inlet, a fluid outlet, and a first mating surface. A second vessel body is provided with a second mating surface in engagement with the first mating surface.

The first mating surface and the second mating surface are welded together to bond the first vessel body and the second vessel body together to form a fluid cavity.

According to a further embodiment, the first vessel body is supported on a backing fixture prior to welding the first mating surface and the second mating surface.

According to at least another embodiment, a fluid vessel assembly is assembled from a method providing a first vessel body with a fluid inlet, a fluid outlet, and a first mating surface. A second vessel body is provided with a second mating surface in engagement with the first mating surface. The first mating surface and the second mating surface are welded together to bond the first vessel body and the second vessel body together to form a fluid cavity.

According to at least another embodiment, a fluid vessel assembly is provided with a first vessel body with a first mating surface with a first plurality of generally planar nonparallel regions. The first vessel body forms a first portion of a fluid cavity with a fluid inlet and a fluid outlet. A second vessel body is provided with a second mating surface with a second plurality of generally planar nonparallel regions sized to engage the first mating surface. The second vessel body forms a second portion of the fluid cavity. The first mating surface and the second mating surface are friction stir welded together to bond the first vessel body and the second vessel body together. The fluid vessel assembly does not include any threaded fasteners attaching the first vessel body to the second vessel body. The fluid vessel assembly does not include an additional gasket associated with the first mating surface or associated with the second mating surface between the first vessel body and the second vessel body.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

On-board battery chargers and other electronic products for vehicles, particularly electric vehicles are liquid cooled. Optionally, liquid cooled electronics might also be applied to sealed electronic components in cavities, such as closed housing main covers, printed circuit boards, internal frames, converters, batteries, telecommunications, or any electrical device that may employ liquid cooling.

Market demands require the seals of gasketed vessel assemblies to pass enhanced specifications to increased fluid pressures, vibrations and chemical agents, while also requesting a reduction in costs and reduction in time to assemble. The gasketed vessel assemblies are also prone to failures caused by assembly errors. Over-torque of a fastener can result in breakage of the fluid vessel. Under-torque of a fastener can result in leakage of the fluid vessel. Misplacement or misalignment of the gasket can result in leakage of the fluid vessel.

Figure 1:
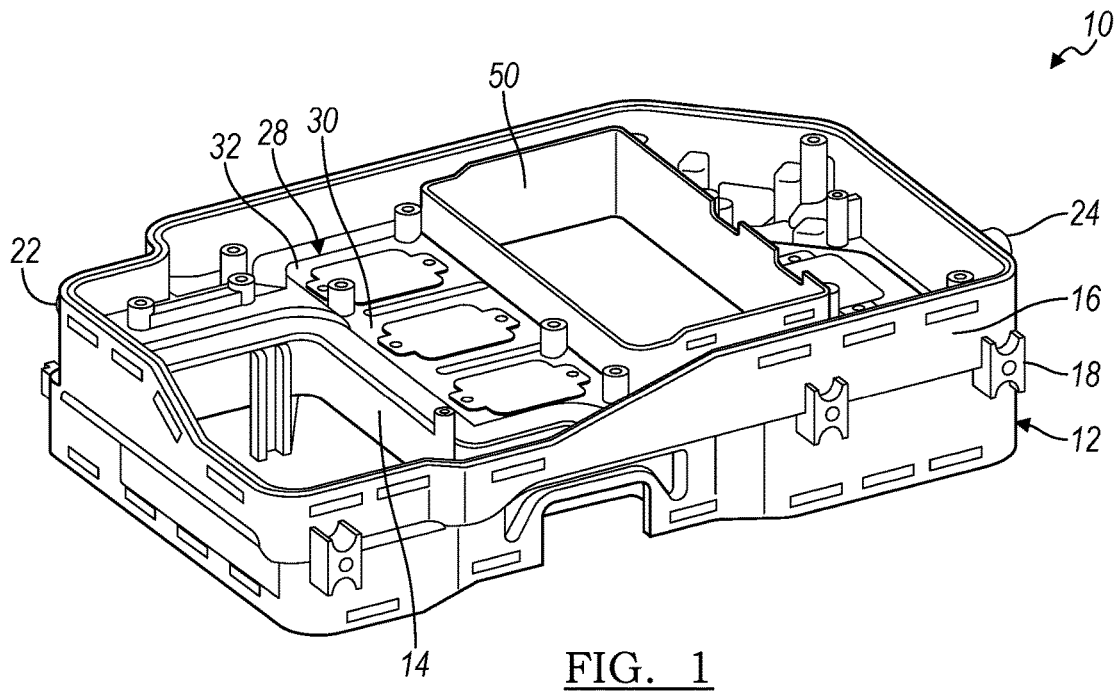
FIG. 1 is a front perspective view of an onboard vehicle charger with a fluid vessel assembly according to an embodiment.
Figure 2:
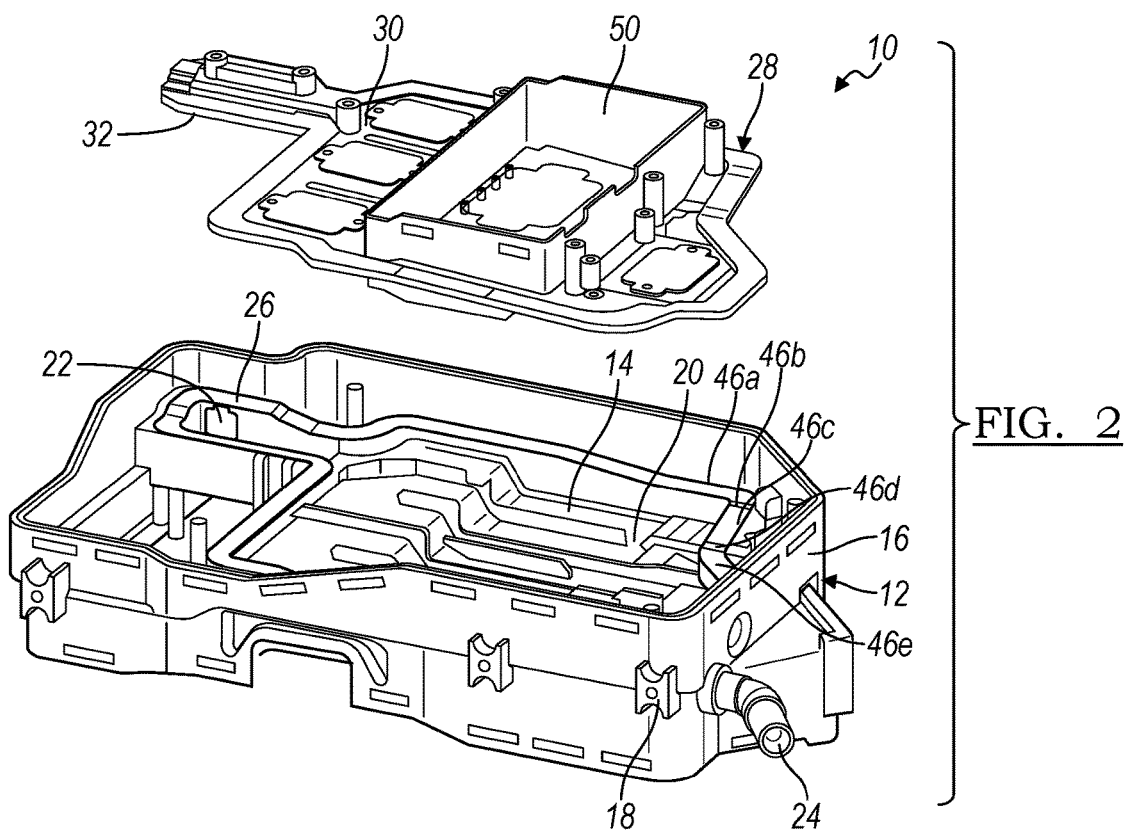
FIG. 2 is an exploded perspective view of the onboard vehicle charger of FIG. 1.

FIGS. 1 and 2 illustrate an on-board vehicle battery charger 10 with a fluid vessel assembly according to an embodiment. Although an on-board vehicle battery charger 10 is illustrated, an electronic product with a fluid vessel may be utilized, such as converters, batteries, telecommunications, and the like.

The on-board battery charger 10 includes a housing 12 that is formed from a conductive structural material, such as die-cast aluminum. The housing 12 includes a substrate 14 with sidewalls 16 extending about a periphery of the housing 12. The housing 12 includes a mounting pattern 18 on the sidewalls 16 to be fastened to a vehicle body.

The housing 12 includes a fluid cavity 20 formed into the substrate 14 as illustrated in FIG. 2. The housing 12 provides a first fluid vessel body with the fluid cavity 20 so that fluid can be conveyed through the housing 12 to cool components that are associated with the housing 12. A pair of ports 22, 24 are provided in fluid communication with the cavity 20 to convey fluid through the cavity of the housing 12. A mating surface 26 is formed upon the substrate 14 about a perimeter of the cavity 20. The mating surface 26 is generally perpendicular to the sidewalls 16 of the housing 12. If the housing 12 is die-cast, the sidewalls 16 are at a slight angle relative to the substrate 14 for removal of the housing 12 from the mold. Accordingly, the sidewalls 16 are near perpendicular to the mating surface 26, as permitted by a draft angle of the sidewalls 16.

With reference to FIGS. 1 and 2, a cover 28 is provided to enclose and seal the cavity 20. The cover 28 is also formed of a conductive structural material, such as die-cast aluminum. The cover 28 also has a substrate 30 and is in the general shape of a cover plate for providing a second fluid vessel body. The cover 28 has a mating surface 32 sized to engage the mating surface 26 of the housing 12. The mating surface 32 of the cover 28 is friction stir welded to the mating surface 26 of the housing 12 to bond the cover 28 to the housing 12 as a sealed fluid vessel assembly 10.

Electrical components are installed to the housing 12 and the cover 28 that generate significant heat during operation. The heat is transferred through the housing 12 and the cover 28 to fluid that passes through the cavity 20 to cool the electrical components. The friction stir welded connection of the cover 28 to the housing 12 maintains a liquid tight seal at operational pressures. The friction stir welded connection can withstand pressures up to ten atmospheric bars. Applicable pressures of the fluid cooling typically operate up to six atmospheric bars. The friction stir welded connection avoids the use of fasteners, such as threaded fasteners or adhesives to connect the cover 28 and the housing 12. The friction stir welded connection avoids the use of a gasket between the cover 28 and the housing 12. The elimination of the fasteners and the gasket limits closure costs and minimizes anomalies that may lead to breakage or leakage. The friction stir welded connection is automated for consistency and repeatability.

Figure 3:
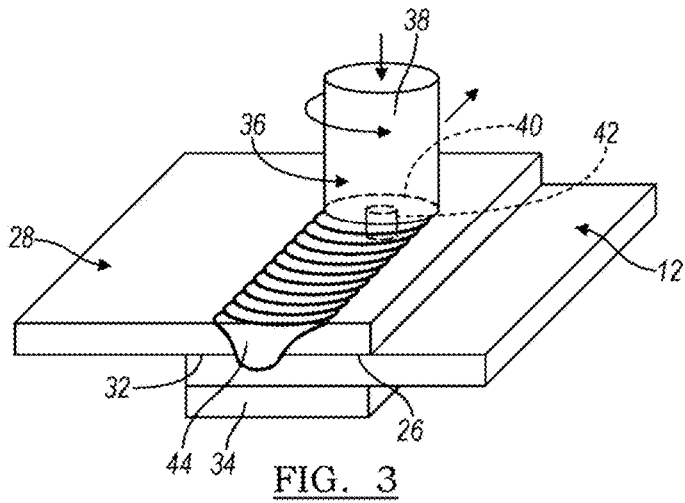
FIG. 3 is a front perspective view of a manufacturing process for the fluid vessel assembly of FIG. 1 according to an embodiment.

FIG. 3 illustrates the friction stir welding process schematically. The housing 12 is placed upon a backing bar 34 or fixture for structural resistance support to the housing 12 during the welding process. The cover 28 is placed upon the housing 12 so that the cover mating surface 32 overlaps the housing mating surface 26. A friction stir welding tool 36 is provided with a body 38 with a primary friction surface 40 located at a distal end, known as a shoulder. A stir component known as a probe 42 extends from the shoulder 40.

The friction stir welding tool 36 is rotated and brought into contact with the cover mating surface 32. The friction stir welding tool 36 is rotated with sufficient speed and pressed into the cover mating surface 32 with sufficient down force that the probe 42 causes friction with the cover mating surface 32 and melts a stir zone 44 into the cover mating surface 32 and partially into the housing mating surface 26. Additionally, the rotation and down force of the friction stir welding tool 36 causes the shoulder friction surface 40 to cause friction with the cover mating surface 32 and further melt the stir zone 44 of the cover mating surface 32.

The stir zone 44 melts and stirs the cover mating surface 32 and the housing mating surface 26 to combine the materials. Upon cooling the stir zone 44 cools as a weld 44 thereby welding and joining the cover plate 28 to the housing 12 as a joined fluid vessel assembly 10. The welded connection provides a tight seal with controlled and minimized dimensions to maximize coolant cavity volume. The welded connection is assembled in minimal manufacturing time. Anomalies in the automated weld process can be seen by visual inspection, and also tested by leak testing.

Figure 4:
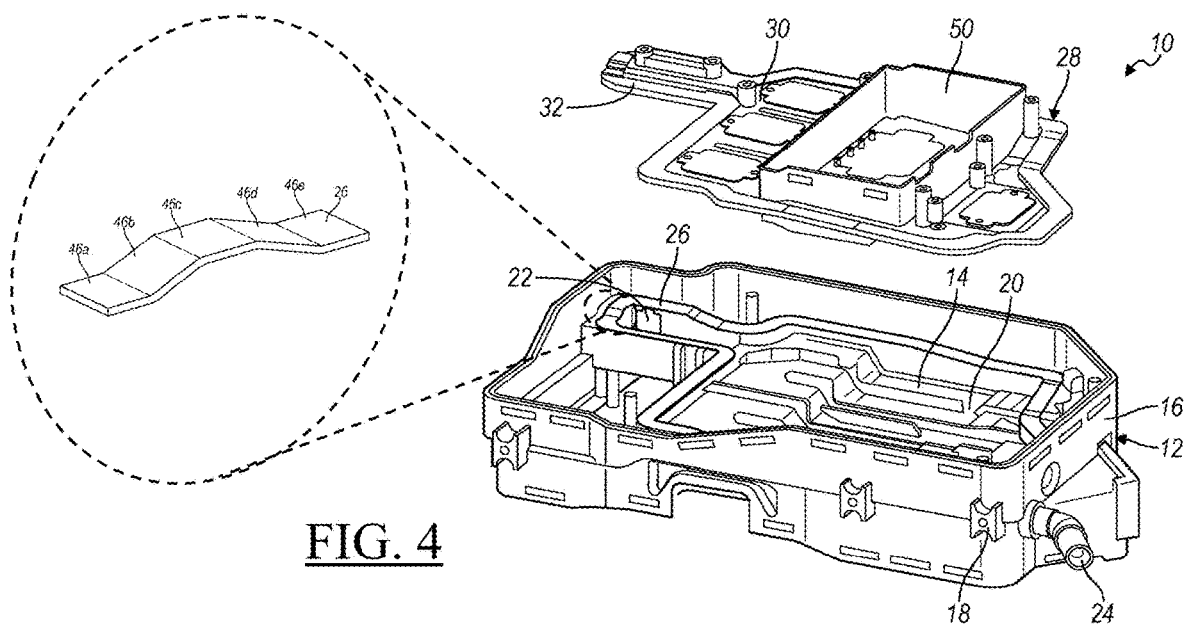
FIG. 4 is a front perspective view of a portion of the fluid vessel assembly of FIG. 1 according to an embodiment.

Referring again to FIGS. 1 and 2, the housing mating surface 26 and the cover mating surface 32 each include a plurality of regions 46a, 46b, 46c, 46d, 46e about the perimeters that are not parallel. In other words, each of the housing mating surface 26 and the cover mating surface 32 does not lie in only one plane, permitting the housing mating surface 26 and the cover mating surface 32 to match an applicable contour of the cavity 20. FIG. 4 illustrates a detailed view of a plurality of regions 46a, 46b, 46c, 46d, 46e of the housing mating surface 26 in accordance with an embodiment of the present disclosure. The plurality of regions 46a, 46b, 46c, 46d, 46e are each generally planar but are not parallel to each other. The regions 46a, 46b, 46c, 46d, 46e may be angled relative to each other less than sixty-five degrees for a five-axis automated friction stir welder and a normal fixture 34. The regions 46a, 46b, 46c, 46d, 46e may be angled relative to each other less than fifteen degrees for a three-axis automated friction stir welder and a dedicated fixture 34. According to another embodiment, the regions 46a, 46b, 46c, 46d, 46e may be angled sequentially less than five degrees for the three-axis automated friction stir welder and a normal fixture 34.

Radiuses are provided at each intersection between each region 46a, 46b, 46c, 46d, 46e. The radiuses may be at least half of the diameter of the body 38 of the friction stir welding tool 36. For example, the radiuses are each five millimeters or greater when the friction stir welding tool 36 has a ten-millimeter diameter body 38.

Figure 5:
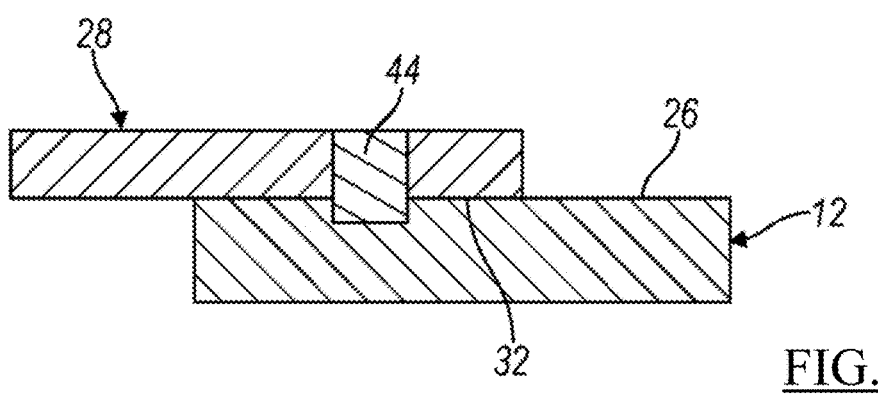
FIG. 5 is a side section view of the fluid vessel assembly of FIG. 1 according to an embodiment.

FIG. 5 illustrates a cross-section of the welded connection 44 of the mating surface 26 of the housing 12 and the mating surface 32 of the cover plate 28. The welded connection has a depth and a width that are controlled based upon the sizing of the friction stir welding tool 36, the applicable down force and the rotational speed, the selection of these variables and the control of the weld 44 dimensions are known in the art.

Figure 6:
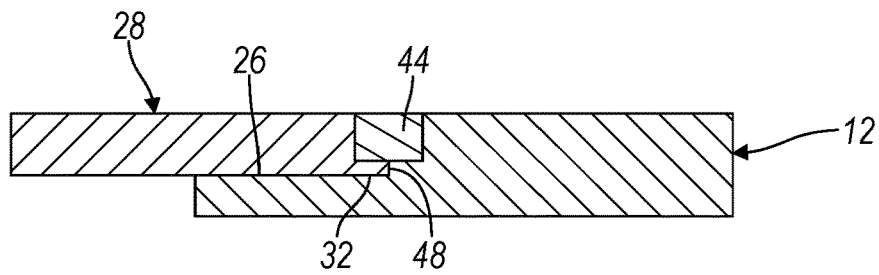
FIG. 6 is a side section view of the fluid vessel assembly of FIG. 1 according to another embodiment.

FIG. 6 illustrates a cross-section of the welded connection 44 of the mating surface 26 of the housing 12 and the mating surface 32 of the cover plate 28 according to another embodiment. The mating surface 26 of the housing 12 is formed recessed adjacent an abutment edge 48 so that the mating surface 32 of the cover 28 overlaps the housing mating surface 26 and abuts the abutment edge 48. The weld 44 is formed through the cover 28 and the housing 12 along the abutment of the cover 28 and the abutment surface 48 of the housing 12. The weld 44 has a smaller depth, thereby requiring a smaller friction stir welding tool 36. The weld 44 of FIG. 6 increases contact between the cover 28 and the housing 12 while requiring a smaller volume at the connection.

Figure 7:
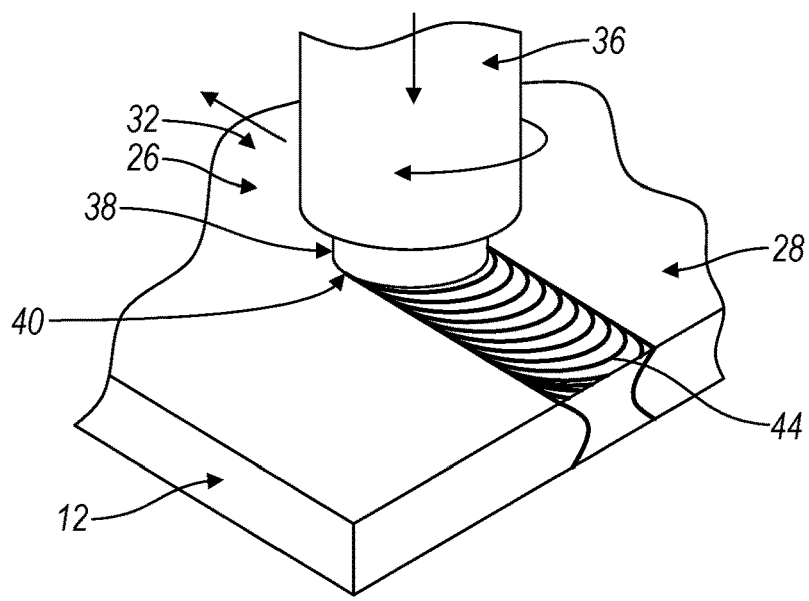
FIG. 7 is a front perspective view of a manufacturing process for the fluid vessel assembly of FIG. 1 according to another embodiment.

FIG. 7 illustrates a schematic view of the welded connection 44 of the mating surface 26 of the housing 12 and the mating surface 32 of the cover plate 28 according to another embodiment. The mating surface 26 of the housing 12 and the mating surface 32 of the cover 28 abut only and do not overlap. The weld 44 is formed through the cover 28 and the housing 12 along the abutted housing mating surface 26 and the cover mating surface 32.

Figure 8:
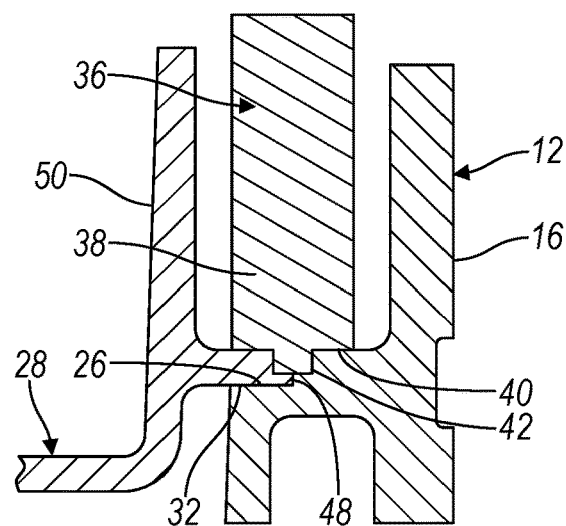
FIG. 8 is a side section view of a manufacturing process for the fluid vessel assembly of FIG. 1 according to another embodiment.

Referring again to FIGS. 1 and 2, the housing 12 includes the sidewall 16. Likewise, the cover 28 also includes a sidewall 50 extending from the substrate 30 to retain electrical components. FIG. 8 illustrates a cross-section of the fluid vessel assembly 10 illustrating the friction stir welding operation between the sidewalls 16, 50 of the housing 12 and the cover 28. In the applicable operation, the body 38 of the friction stir welding tool 36 has a diameter of ten to twelve millimeters. In order to provide clearance for the body 38, the sidewalls 16, 50 are spaced apart a distance that is greater than a diameter of the body 38 of the welding tool 36. The size of the welding tool 36 is determined by the size of the weld. Therefore, the sidewalls 16, 50 are spaced apart by a distance that is greater than a width of the weld, such as at least one millimeter greater. In the depicted embodiment, the sidewalls are spaced apart by fourteen millimeters. For use of any other diameter body 38 for other welding tools 36 with other welding width requirements, the spacing may vary in order to maintain compactness, while providing clearance for the welding operation.

In this embodiment, the housing 12 includes the abutment surface 48. The friction stir welding tool 36 is centered along the abutment surface 48, which is seven millimeters from the housing sidewall 16 in the depicted embodiment. The friction stir welding tool 36 is separated from the housing sidewall 16, or from any surrounding obstacle by at least one millimeter. Any obstacle protruding laterally from any of the sidewalls 16, 50 is designed to provide at least one millimeter of clearance with the passing welding tool 36.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fluid vessel assembly, comprising:
a first vessel body comprises a first sidewall and a first mating surface, the first vessel body forming a first portion of a fluid cavity with a fluid inlet and a fluid outlet, wherein the first mating surface extends perpendicular to the first sidewall; and
a second vessel body comprises a second sidewall and a second mating surface sized to engage the first mating surface, the second vessel body forming a second portion of the fluid cavity, wherein the second mating surface extends perpendicular to the second sidewall;
wherein the first mating surface is provided with a first plurality of planar nonparallel regions,
wherein the second mating surface is provided with a second plurality of nonparallel planar regions, and
wherein the first mating surface and the second mating surface are welded together to bond the first vessel body and the second vessel body together such that the first plurality of planar nonparallel regions is welded to the second plurality of planar nonparallel regions.

2. The fluid vessel assembly of claim 1, wherein each of the first plurality of planar nonparallel regions is oriented at an angle that is less than sixty-five degrees relative to each sequential region.

3. The fluid vessel assembly of claim 2, wherein each of the first plurality of planar nonparallel regions is oriented at an angle that is less than fifteen degrees relative to each sequential region.

4. The fluid vessel assembly of claim 1, wherein the first plurality of planar nonparallel regions of the first mating surface overlaps the second plurality of planar nonparallel regions of the second mating surface.

5. The fluid vessel assembly of claim 1, wherein the first plurality of planar nonparallel regions of the first mating surface abuts the second plurality of planar nonparallel regions of the second mating surface.

6. The fluid vessel assembly of claim 1, wherein the first plurality of planar nonparallel regions of the first mating surface overlaps and abuts the second plurality of planar nonparallel regions of the second mating surface.

7. The fluid vessel assembly of claim 1, wherein the first mating surface and the second mating surface are welded together by friction stir welding.

8. The fluid vessel assembly of claim 7, wherein the friction stir welding is executed between the sidewall of the first vessel body and the sidewall of the second vessel body.

9. The fluid vessel assembly of claim 1,
wherein the sidewall of the first vessel body is spaced apart from the sidewall of the second vessel body by a distance that is at least one millimeter longer than a width of a weld along the first vessel body and the second vessel body.

10. An assembly to cool a vehicle on-board battery charger, the assembly comprising the fluid vessel assembly of claim 1, wherein the first vessel body defines a cooling cavity body, and the second vessel body defines a cover plate.

11. The fluid vessel assembly of claim 1, wherein the fluid vessel assembly does not comprise any threaded fasteners attaching the first vessel body to the second vessel body.

12. The fluid vessel assembly of claim 1, wherein the fluid vessel assembly does not comprise a gasket associated with the first mating surface or associated with the second mating surface between the first vessel body and the second vessel body.

13. The fluid vessel assembly of claim 1, wherein the fluid vessel assembly withstands an internal pressure of at least six atmospheric bars.

14. The fluid vessel assembly of claim 1, wherein the first plurality of planar nonparallel regions is provided along a perimeter of the welded first mating surface.

15. The fluid vessel assembly of claim 1, wherein a radius is provided at each intersection of the first plurality of planar nonparallel regions.

16. The fluid vessel assembly of claim 1, wherein the first vessel body comprises a mounting pattern on the sidewall of the first vessel body to fasten the first vessel body to a vehicle.

17. The fluid vessel assembly of claim 1, wherein the first mating surface and the second mating surface are not coplanar.

18. A fluid vessel assembly, comprising:
a first vessel body comprises a first sidewall and a first mating surface with a first plurality of generally planar nonparallel regions, the first vessel body forming a first portion of a fluid cavity with a fluid inlet and a fluid outlet, wherein the first mating surface extends perpendicular to the first sidewall; and
a second vessel body comprises a second sidewall and a second mating surface with a second plurality of generally planar nonparallel regions sized to engage the first mating surface, the second vessel body forming a second portion of the fluid cavity, wherein the second mating surface extends perpendicular to the second sidewall
wherein the first mating surface and the second mating surface are friction stir welded together to bond the first vessel body and the second vessel body together such that the first plurality of planar nonparallel regions is welded to the second plurality of planar nonparallel regions,
wherein the fluid vessel assembly does not comprise any threaded fasteners attaching the first vessel body to the second vessel body, and
wherein the fluid vessel assembly does not comprise a gasket associated with the first mating surface or associated with the second mating surface between the first vessel body and the second vessel body.

* * * * *